Aug. 25, 1959

C. S. STARR ET AL 2,901,020

WHEEL FOR VEHICLES

Filed March 4, 1955

INVENTORS
Charles S. Starr
Oliver G. Barnes
BY Lamont Johnston
ATTORNEY ns patent
2,901,020
Patented Aug. 25, 1959

2,901,020

WHEEL FOR VEHICLES

Charles S. Starr, Hixson, and Oliver G. Barnes, Chattanooga, Tenn., assignors to Notat Tire Company, Chattanooga, Tenn., a corporation of Tennessee Application March 4, 1955, Serial No. 496,475

(Filed under Rule 47(a) and 35 U.S.C. 116)

4 Claims. (Cl. 152—307)

This invention relates to wheels and, more particularly, to the construction of solid tires or wheels from radial layers of resilient material and of fabric, being a continuation-in-part of U.S. Patent No. 2,704,102, issued March 15, 1955, entitled "Cushion Tires." Such wheels are valuable for use on farm and industrial vehicles of all types, such as tractors, payloaders, Hyster lifts, Clark lifts, fork lifts, chore boys, bus buggies and shop mules.

It is an object of this invention to provide a tire or wheel composed of a plurality of alternating radially extending layers of resilient material and of fabric, secured in abutting relation to form the general shape of a toroid.

Another object of the invention is to provide a tire or wheel composed of a plurality of alternating layers of resilient material and of fabric, which may or may not be formed on a tire rim.

A further object of the invention resides in securing the sections of the tire or wheel in compressed abutting relation, with a continuous band passing through all the sections.

Still another object is to provide a pad formed from a plurality of wedge-shaped laminated sections of fabric and resilient material for use with other like pads in making a built-up tire or wheel.

A still further object of the invention resides in providing a tire or wheel which is simple and durable in construction, reliable and efficient in use, and inexpensive to manufacture.

Other objects and advantages of the invention will be apparent during the course of the following description.

In the accompanying drawing forming a part of this specification and in which like numerals are employed to designate like parts throughout the same, Fig. 1 is a side elevation of one embodiment of the invention, partly broken away;

Figure 1:
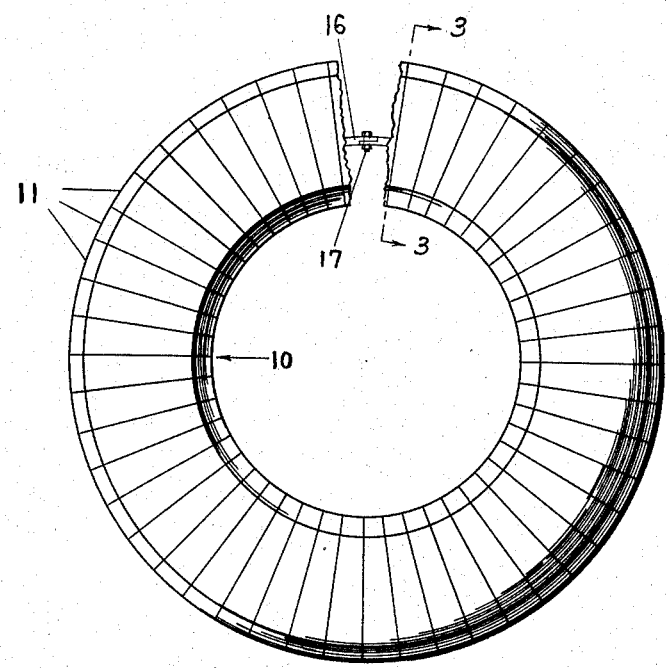
Figure 2:
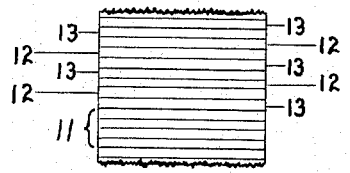
Fig. 2 is an end elevation of a segment of the embodiment of the invention shown in Fig. 1.

Referring now to the drawings in more detail, Fig. 1 discloses a side elevation of a tire or wheel 10, built from a plurality of solid laminated pads 11 joined together in abutting relation. The pads 11 may or may not be built around a rim, not shown, for the tire is so constructed that it will retain its own shape and may fit around a rim to act as a tire or may be directly fitted to the hub of an axle to function as a wheel. Each pad 11, as shown in Figs. 1, 2 and 4, comprises two sections, each section consisting of a layer of fabric 12 and a layer of rubber 13. The layers 12 and 13 of each section may be bonded together or they may be separate. In the embodiment illustrated in Figures 1–4, the pads 11 are formed by placing the sections together with the layers of fabric 12 in abutting relationship and fastening the sections together, as by means of nails or staples 14.

The faces of each section and pad 11 taper downwardly from the outer to the inner edge so that they are in substantial radial alignment with the center of the tire or wheel, in substantially the shape of a wedge. The layers 12 may be made from plain or rubber-impregnated fabric, and the layers 13 may be made of hard rubber or of any other resilient material. Such a structure gives a combination of toughness and resiliency heretofore unknown in solid tires or wheels.

To secure the pads 11 together in tight abutting relationship, each layer 12 and 13 is provided with an opening 15 slightly offset from the center thereof toward the hub, so that when the pads are in position to form a tire, a continuous circular opening will be formed by the individual openings 15 through all the sections of the tire. A metal band 16 is inserted through all the openings 15 so that when the ends of the band are joined together by suitable means, such as a bolt 17, a hoop will be formed to maintain the tapering pads 11 in abutting relationship to form a tire or wheel. It has been found that a better quality tire is produced if the metal band 16 extends through the pads 11 slightly offset from the centers of the pads and nearer the hub than the tread. It is believed that the reason for such improved results is due to the greater stresses nearer the hub than the tread portion of the tire, and that the disposition of the metal band 16 nearer the hub creates a more uniform distribution of pressure and stresses throughout the tire.

Figure 3:
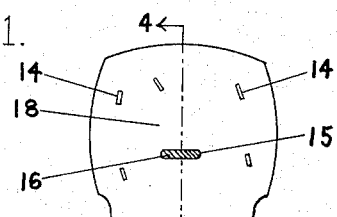
Fig. 3 is a side view of a pad taken on line 3—3 of Fig. 1.
Figure 4:
Fig. 4 is an enlarged side section, taken along the line 4—4 of Fig. 3, of a pad comprising two sections, each section consisting of a layer of fabric and a layer of rubber, or other resilient material.

As shown in Fig. 3, the openings 15 are formed to receive snugly the band 16 to reduce any unnecessary wear and strain on the material caused by the movement of a loose band within an opening. Also, with the opening 15 no larger than the dimensions of the band 16, the shape of the completed wheel is maintained, even under heavy loads and with the severe twisting forces created by steering. Before the ends of the band are secured, the pads 11 are substantially deformed by being compressed against each other by heavy hydraulic pressure or by other suitable external pressure means. The ends of the band are then secured together, as by bolting or welding, or both, and the external pressure on the pads is released so that every pad will be compressed and snugly abut every succeeding pad. When the external pressure is released, the continuous band 16 will then be under heavy tension, maintaining the pads in substantial deformation due to their heavy compression to form a solid, durable tire or wheel, capable of maintaining its own shape without the aid of a rim.

The radially extending pads 11 have sufficient rigidity to support heavy loads because of their laminated fabric and rubber construction, the fabric and rubber reinforcing each other to afford sufficient stiffness. In addition, the heavy compression of pads on the band 16 squeezes them in their center areas 18 adjacent their openings 15 in a manner which may be compared with the squeezing of a sausage balloon in its center. This squeezing causes the rubber and fabric to be tightly compressed in both directions from the band 16, that is, inwardly and outwardly. The compression inwardly causes the tire or wheel to be firmly attached by compression and friction to a hub on which it is forced, without the use of a rim, lip or band iron to clamp the tire onto the hub. At the same time, the completed wheel 10 can be easily mounted on or demounted from a hub, merely by the application of force. The compression outwardly reinforces the fabric and rubber composition in giving rigidity to the wheel, so that it is able to support heavy loads and to withstand severe twisting forces. The heavy compression imparts considerable resilience and bounce to the wheel, greatly exceeding the resilience of a solid rubber tire. When the wheel is under a heavy load, the part of its outer periphery in contact with the ground is yieldingly held in shape by the heavy compression of the pads together, the compression being more than sufficient to support the force of the load upon the ground, distributing that load along all the pads adjacent the one in contact with the ground.

The heavy compression of the wedge-shaped pads 11 by the metal band 16 maintains the pads in position and in proper alignment, even when supporting heavy loads, without the use of any adhesive between the pads. Under such compression, the rubber to rubber or fabric to rubber contact of the pads provides sufficient surface friction to insure against lateral slippage of the pads relative to each other.

The outer surface of the tire or wheel may be smooth, as in Fig. 2, or it may be capped with rubber. Under certain circumstances, it may also be desirable to bind the side walls of the pads together with a rubber band vulcanized to the pad walls. The edges of the alternating laminated sections of rubber and fabric, provide a very dependable gripping surface which does not easily slip on wet, greasy or inclined surfaces. With the tire section laminated as described, about half the tire surface will be fabric, which provides excellent traction on wet or inclined surfaces. By contrast, a pneumatic tire often slips and spins on inclined surfaces, whereas the fabric of a wheel made in accordance with this invention prevents such slipping. Also, in a tire made by the invention, about half of the surface is of rubber, which provides sufficient resilience to reduce the shock ordinarily experienced by solid tires of other types, and also provides excellent traction on dry surfaces. It is not practical to use ordinary solid tires on vehicles designed for pneumatic tires because the shock is too great, but tires made in accordance with the present invention are used very successfully in place of pneumatic tires.

Since the laminated sections of rubber and fabric are disposed radially there is always an alternating rubber and fabric surface on the periphery of the wheel. As the wheel gradually becomes worn down, the radially disposed rubber and fabric layers become worn off at the same rate. Radial disposition of the laminated sections affords the greatest resistance to external pressure, because the lines of force will coincide with the greatest dimensions of any particular section in contact with the surface upon which the tire or wheel rolls. The rigidity of any particular section is assured by the heavy compression of abutting sections maintained by the tensile band 16.

The combination structure of rubber and fabric allows the combined sections to be used as a wheel, as well as a tire, because of its integral strength and ability to maintain the shape of a wheel under varied and adverse conditions. A wheel made in accordance with this invention does not develop flat places, but wears down evenly all around its periphery. By contrast, if the structure were of solid rubber, the wheel would soon lose its shape and develop flat places because compressed solid rubber is very hard and its resilience is not as great as a combination structure of rubber and fabric, as in the present invention.

Figure 5:
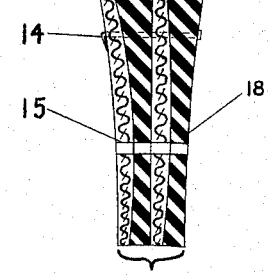
Fig. 5 is an enlarged side section, similar to Fig. 4, of a pad made in accordance with a modified form of the invention.

In constructing tires and wheel according to this invention, it has been the practice to build the pads from old pneumatic tire casings, a die of suitable shape and size being used for stamping or cutting the sections from the casings, each casing consisting of a ring of multi-ply fabric and a ring of rubber. According to present practice, a pad is built up from a pair of stamped tire casings, the fabric faces abutting each other, after the facings have been ground, so that the built-up pads will have slightly tapering faces. However, tires of equal quality have been constructed of stamped tire casings in which a rubber face abuts a fabric face, as illustrated in Fig. 5, so that the fabric and rubber sections alternate with each other. Bands for holding the tire pads together are preferably made of hot rolled steel of low carbon content to allow the band to be bent into a hoop without sacrifice of tensile strength and without danger of carbon crystallization in those parts of the band, which might be heated, such as the welded ends.

It is to be clearly understood that the present invention comprises a complete tire or wheel, ready for mounting on a hub simply by the application of force and then ready for immediate use. No further adjustments, tightening of cables or tightening of band irons is required.

A tire made in accordance with the present invention is inexpensive, since its basic materials are cheap. Old pneumatic tire casings are of practically no value when they are not in sufficiently good shape to warrant their being recapped for further use.

It will be apparent to those skilled in the art that various changes may be made in the invention, without departing from the spirit and scope thereof, and therefore the invention is not limited by that which is shown in the drawings and described in the specification, but only as indicated in the appended claims.

We claim:

1. The process of building vehicle wheels from uniform wedge-shaped pads of resilient material and of fabric which comprises stamping the pattern of the pad from a section formed by a layer of resilient material of substantial thickness bonded to a layer of fabric of substantial thickness, tapering the opposite faces of the section, fastening a pair of sections together in abutting relation to form a pad, forming an opening through each pad, inserting a length of metal band through the openings in a series of said pads to form a circle of pads, substantially deforming the pads elastically by pressing them heavily against each other, securing the ends of the band together, and releasing the pressure on the pads to allow them to abut while substantially deformed elastically face to face against each other in the shape of a wheel.

2. The process of building vehicle wheels from uniform wedge-shaped laminated pads of resilient material and of fabric which comprises stamping the pattern of the pad from a section formed by a layer of resilient material of substantial thickness bonded to a layer of fabric of substantial thickness, tapering the opposite faces of the section, fastening a pair of sections together in abutting relation to form a pad, forming an opening through each pad slightly offset from the center thereof and nearer to the hub than the tread of the pad, inserting a length of metal band through the openings in a series of said pads to form a circle of pads, the abutting faces being radially disposed substantially deforming the pads elastically by forcing them against each other, securing the ends of the band together, and releasing the force on the pads to allow them to abut while substantially deformed elastically face to face against each other in the shape of a wheel.

3. A vehicle wheel in the shape of a solid toroid having all its surfaces free and unsupported comprising a series of radially disposed layers of fabric and rubber of substantial thickness throughout their lengths having aligned apertures therein and a circular steel band passing through said apertures, said layers being elastically deformed to a substantial degree by compaction under heavy pressure in only a lateral direction and said band having its ends secured together to hold said layers in their substantially deformed state.

4. The invention according to claim 3 in which the layers of fabric and rubber are alternated and coextensive.

References Cited in the file of this patent

UNITED STATES PATENTS

| | | |
|---|---|---|
| 823,839 | Wright et al. | June 19, 1906 |
| 1,182,600 | Supernaw | May 9, 1916 |
| 1,500,113 | Dade | July 8, 1924 |
| 1,532,977 | Atwood | Apr. 7, 1925 |
| 2,476,786 | Wallis | July 19, 1949 |

FOREIGN PATENTS

| | | |
|---|---|---|
| 5,692 | Great Britain | 1895 |
| 15,481 | Great Britain | 1897 |
| 21,278 | Great Britain | 1909 |